United States Patent Office 3,293,254
Patented Dec. 20, 1966

3,293,254
2',3',4',9'-TETRAHYDRO-6'-ALKOXY SPIRO-[PIPERI-
DINE-4,1'-[1H]PYRIDO[3,4-b]INDOLES]
Jackson B. Hester, Jr., Portage, Mich., assignor to The
Upjohn Company, Kalamazoo, Mich., a corporation of
Delaware
No Drawing. Filed Jan. 31, 1964, Ser. No. 341,756
7 Claims. (Cl. 260—294.7)

This invention relates to novel compositions of matter and to methods for producing them. In particular, this invention relates to novel 2',3',4',9'-tetrahydro-6'-alkoxy-spiro-[piperidine-4,1'-[1H]pyrido[3,4-b]indoles] of the formula:

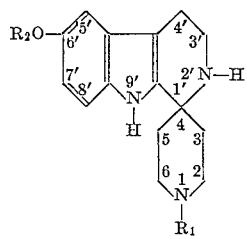

(I)

wherein $R_1$ and $R_2$ are alkyl of 1 to 4 carbon atoms, inclusive. Examples of alkyl of 1 to 4 carbon atoms are methyl, ethyl, propyl, butyl, and isomeric forms thereof. $R_1$ and $R_2$ can be the same or different.

The novel 2',3',4',9'-tetrahydro-6'-alkoxyspiro[piper-idine-4,1'-[1H]pyrido[3,4-b]indoles] of Formula I are amines, and exist in the non-protonated or free base form, or in the protonated or acid addition salt form depending on the pH of the environment. They form stable proton-ates, i.e., mono- or diacid addition salts, on neutralization with suitable acids, for example, hydrochloric, hydrobromic, sulfuric, phosphoric, nitric, acetic, benzoic, palmitic, salicylic, glycolic, succinic, nicotinic, tartaric, maleic, malic, pamoic, methanesulfonic, cyclohexanesulfamic, picric, and lactic acids, and the like. These acid addition salts are useful for upgrading the free bases. The free bases are useful as acid acceptors in neutralizing undesirable acidity or in absorbing an acid as it is formed in a chemical reaction, for example, a dehydrohalogenation reaction in which hydrogen and chlorine, bromine, or iodine are removed from vicinal carbon atoms.

The novel Formula I compounds form salts with fluosilicic acid which are useful as mothproofing agents according to U.S. Patents 1,915,334 and 2,075,359. They also form salts with thiocyanic acid which condense with formaldehyde to form resinous materials useful as pickling inhibitors according to U.S. Patents 2,425,320 and 2,606,155.

The Formula I compounds of this invention also form salts with penicillins. These salts have solubility characteristics which cause them to be useful in the isolation and purification of penicillins, particularly benzyl penicillin. Said salts can be formed either by neutralization of the free acid form of a compound of Formula I with the free acid form of a penicillin, or by a metathetical exchange of the anion of an acid adition salt of a Formula I compound, for example, the chloride ion of a hydrochloride, with the anionic form of a penicillin.

The novel 2',3',4',9'-tetrahydro-6'-alkoxyspiro[piper-idine-4,1'-[1H]pyrido[3,4-b]indoles] of Formula I exhibit anti-inflammatory activity as shown by the granu-loma pouch technique in rats, and are useful in treating inflammatory conditions topically, locally, and systematically in mammals, e.g., humans, cattle, horses, dogs, and cats, and in birds, e.g., poultry. Tests with animals have also shown these compounds to have diuretic and anorexigenic effects, and the compounds are therefore useful for those purposes. These compounds also inhibit the action of Newcastle disease virus on chick embyro cells.

The novel 2',3',4',9'-tetrahydro-6'-alkoxyspiro[piper-idine-4,1'-[1H]pyrido[3,4-b]indoles] of Formula I are produced by a process which comprises mixing a 4-piper-idone of the formula:

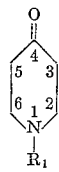

(II)

wherein $R_1$ is as given above, with a tryptamine of the formula:

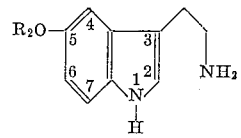

(III)

wherein $R_2$ is as given above, at an elevated temperature and in the presence of a condensing agent.

Although most of the condensing agents known in the art can be used in the novel process of this invention, preferred condensing agents are those which contain phosphorus, e.g., phosphorus oxychloride, phosphorus pentoxide, polyphosphoric acid, and the like. Phosphorus oxychloride is particularly preferred as a condensing agent.

It was observed that water is produced during the novel process of this invention and that said condensing agent need not be present during the water-formation stage. A preferred embodiment of the novel process of this invention comprises the steps, (1) mixing the Formula II 4-piperidone and the Formula III tryptamine at an elevated temperature, and (2) mixing the organic product from step (1) with a condensing agent. Although a catalyst is not essential, the formation of water is advantageously accelerated by the presence of a catalytic amount of a strong acid, e.g., p-toluenesulfonic acid, sulfuric acid, oxalic acid, and the like. In some instances, the condensing agent will also serve to catalyze the production of water if the agent is present at the start of the reaction.

The preferred reaction temperature range for the novel process of this invention is about 50° to about 150° C. At lower temperatures, the desired reactions proceed at an inconveniently slow rate. There is usually no reason to use a higher temperature, and thermal degradation of the reactants or desired product may occur at higher temperatures.

Although a reaction diluent is not essential in the novel process of this invention, it is usually advantageous to use an inert liquid diluent. Preferred as diluents are those liquids which have boiling points within the preferred reaction temperature range and which are substantially immiscible with water. When such diluents are used, water can advantageously be removed by azeotropic distillation as it is formed. The same diluent can be used in both stages of the preferred two-stage embodiment of the novel process of this invention, or a different diluent can be used in the second stage. Examples of suitable diluents are benzene, toluene, the xylenes, ethylbenzene, isopropylbenzene, chlorobenzene, chloroform, carbon tetrachloride, and the like. The amount of diluent is not critical, enough preferably being used to give a homogeneous fluid reaction mixture at the preferred reaction temperature.

The reaction time will depend upon such factors as the reaction temperature, the relative amounts of reactants and diluent, and the nature and amount of the condensing agent and acid catalyst, if one is used. As will be apparent to those skilled in the art, the optimum reaction time will vary for each set of reaction conditions. In the preferred two-stage embodiment, production of water will usually cease when the first stage is complete. If this water is removed by azeotropic distillation as it is formed, the time necessary for the first stage can readily be determined. When phosphorus oxychloride and a reaction temperature in the range about 80° to about 90° C. are used, the second stage of the reaction usually requires about one to about 5 hours.

Although equimolecular amounts of the Formula II piperidone and the Formula III tryptamine interact to form the desired product, it is preferred to use a slight excess of the piperidone to insure that substantially all of the more expensive tryptamine is consumed. Excess piperidone can also usually be removed from the desired Formula I amine more readily than can excess tryptamine. About 0.001 to about one part by weight of an acid catalyst per 100 parts of total reactants will usually provide satisfactory catalysis of the water-forming reaction. It is usually advantageous to use a weight of condensing agent, for example, phosphorus oxychloride, at least equal to the total weight of reactants. Preferably, about 100 to about 500 parts by weight of condensing agent is used for each 100 parts by weight of total reactants.

After the desired reaction is complete, the Formula I product can be isolated by conventional techniques, for example, by evaporation of any diluent at reduced pressure, and can be purified by digestion or recrystallization with a suitable solvent or mixture of solvents. In some instances, the initial product is an acid addition salt, and neutralization with a base, for example, sodium hydroxide or potassium hydroxide, is necessary to produce the free base form.

The free base form of the 2',3',4',9'-tetrahydro-6'-alkoxyspiro[piperidine - 4,1' - [1H]pyrido[3,4-b]indole] can be transformed to an acid addition salt by neutralization with the appropriate amount of the corresponding inorganic or organic acid, examples of which are given above. These transformations can be carried out by a variety of procedures known to the art to be generally useful for the preparation of amine acid addition salts. The choice of the most suitable procedure will depend on a variety of factors including convenience of operation, economic considerations, and particularly the solubility characteristics of the Formula I amine, the acid, and the acid addition salt. If the acid is soluble in water, the basic compound of Formula I can be dissolved in water containing an equivalent amount of the acid, and thereafter, the water can be removed by evaporation. If the acid is soluble in a relatively non-polar solvent, for example, diethyl ether or diisopropyl ether, separate solutions of the acid and the amine in such a solvent can be mixed in equivalent amounts, whereupon the acid addition salt will usually precipitate because of its relatively low solubility in the non-polar solvent. Alternatively, the basic Formula I compound can be mixed with an equivalent amount of the acid in the presence of a solvent of moderate polarity, for example, a lower alkanol, a lower alkanone, or a lower alkyl ester of a lower alkanoic acid. Examples of these solvents are ethanol, acetone, and ethyl acetate, respectively. Subsequent admixture of the resulting solution of acid addition salt with a solvent of relatively low polarity, for example, diethyl ether or hexane, will usually cause precipitation of the acid addition salt. The acid addition salts are usually solids and can be purified by recrystallization from a suitable solvent or mixture of solvents. Either monoacid or diacid addition salts can be formed by using one or two equivalents of the acid.

The invention can be more fully understood by the following example:

*Example 1.* — 2',3',4',9'-tetrahydro-6'-methoxy-1-methyl-spiro-[piperidine-4,1'-[1H]pyrido[3,4-b]indole]

A mixture of 5-methoxytryptamine (10.0 g.; 0.053 mole), 1-methyl-4-piperidone (6.57 g.; 0.058 mole), 400 ml. of anhydrous benzene, and about 0.005 g. of p-toluenesulfonic acid was placed in a flask equipped with a reflux condenser and a water trap. Air was purged from the apparatus with a stream of nitrogen and a slight positive pressure of nitrogen was maintained thereafter in the apparatus. The mixture was heated to its boiling point and boiled with reflux and water removal (0.9 ml.) for about 5 hours. The resulting mixture was then cooled to about 25° C. Freshly distilled phosphorus oxychloride (40 ml.; 67 g.) was added. The mixture was allowed to stand at about 25° C. for 2 hours, and was then warmed during one hour to the boiling temperature. After boiling under reflux for 1.5 hours, the reaction mixture was cooled and solvent was removed under reduced pressure. The resulting semi-crystalline residue was stirred with about 50 ml. of benzene. The suspension was filtered, and the solid was washed with benzene and dried.

The dried solid was heated at about 100° C. with 400 ml. of water until most of the solid dissolved. The solution was then treated with decolorizing carbon, filtered, and cooled to about 0° C. Sodium hydroxide was then added until the solution was alkaline. Extraction with ether gave an ether extract which was washed with brine, dried with anhydrous potassium carbonate, and evaporated at reduced pressure to give 2',3',4',9'-tetrahydro-6' - methoxy - 1-methylspiro[piperidine-4,1'-[1H]pyrido-[3,4-b]indole] free base in the form of a yellow gum.

The free base was dissolved in absolute ethanol and acidified with hydrogen chloride. The resulting solid dihydrochloride was recrystallized from a mixture of ethanol and hydrochloric acid to give 3.9 g. of 2',3',4',9'-tetrahydro - 6' - methoxy-1-methylspiro[piperidine-4-,1'-[1H]pyridol[3,4-b]indole] dihydrochloride monohydrate; M.P. 262–265° C. with decomposition. Three additional recrystallizations from a mixture of ethanol and hydrochloric acid gave the same substance; M.P. 264–265° C. with decomposition.

*Analysis.*—Calcd. for $C_{17}H_{25}Cl_2N_3O \cdot H_2O$: C, 54.25; H, 7.23; N, 11.17; Cl, 18.84; $H_2O$, 4.78. Found: C, 54.11; H, 7.51; N, 10.96; Cl, 19.10; $H_2O$, 5.94.

Following the procedure of Example 1 but adding to the ethanol solution of the free base, diethyl ether solutions of hydrogen bromide; sulfuric acid; phosphoric acid; benzoic acid; acetic acid; maleic acid; and cyclohexanesulfamic acid, in place of hydrogen chloride, there are obtained the corresponding hydrobromic; sulfuric; phosphoric; benzoic; acetic; maleic; and cyclohexanesulfamic acid addition salts.

Following the procedure of Example 1 but using in place of the combination of 5-methoxytryptamine and 1-methyl-4-piperidone as reactants, 5-ethoxytryptamine and 1-ethyl-4-piperidone; 5-propoxytryptamine and 1-propyl-4-piperidone; 5-butoxytryptamine and 1-butyl-4-piperidone; and 5-tert-butoxytryptamine and 1-isopropyl-4-piperidone, there are obtained the corresponding 2',3',4',9' - tetrahydro - 6' - alkoxyspiro[piperidine-4,1'-[1H]-pirido[3,4-b]indoles], both has free bases and as dihydrochlorides.

I claim:
1. A compound selected from the group consisting of the free base form and acid addition salts of a compound of the formula:

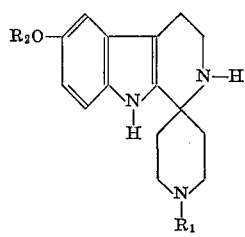

wherein $R_1$ and $R_2$ are alkyl of 1 to 4 carbon atoms, inclusive.

2. 2',3',4',9' - tetrahydro - 6'-methoxy-1-methylspiro[piperidine-4,1'-[1H]pyrido[3,4-b]indole].

3. 2',3',4',9'-tetrahydro-6'-methoxy - 1 - methylspiro [piperidine - 4,1' - [1H]pyrido[3,4-b]indole] dihydrochloride.

4. A process for producing a 2',3',4',9'-tetrahydro-6'-alkoxyspiro[piperidine - 4,1'-[1H]pyrido[3,4 - b]indole] of the formula:

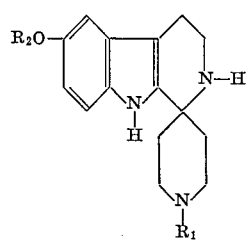

wherein $R_1$ and $R_2$ are alkyl of 1 to 4 carbon atoms, inclusive, which comprises mixing a compound of the formula:

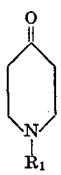

wherein $R_1$ is as given above, with a compound of the formula:

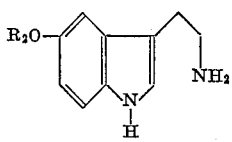

wherein $R_2$ is as given above, at an elevated temperature and in the presence of a condensing agent, to form said 2',3',4',9' - tetrahydro - 6' - alkoxyspiro[piperidine-4,1'-[1H]pyrido[3,4-b]indole].

5. A process for producing a 2',3',4',9'-tetrahydro-6'-alkoxyspiro[piperidine - 4,1'-[1H]pyrido[3,4-b]indole] of the formula:

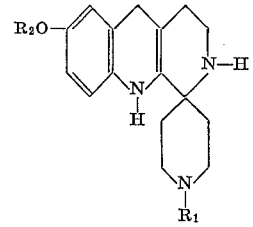

wherein $R_1$ and $R_2$ are alkyl of 1 to 4 carbon atoms, inclusive, which comprises the steps, (1) mixing a compound of the formula:

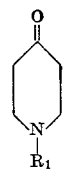

wherein $R_1$ is as given above, with a compound of the formula:

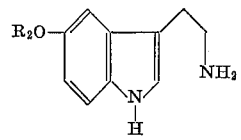

wherein $R_2$ is as given above, at an elevated temperature, and (2) mixing the organic product from step (1) with a condensing agent selected from the group consisting of phosphorus oxychloride, phosphorus pentoxide, and polyphosphoric acid, to form said 2',3',4',9'-tetrahydro-6'-alkoxyspiro[piperidine - 4,1'-[1H]pyrido[3,4-b] indole].

6. The process of claim 5 wherein step 1 is carried out in the presence of an acid catalyst.

7. The process of claim 5 wherein said condensing agent is phosphorus oxychloride.

No references cited.

WALTER A. MODANCE, *Primary Examiner.*

A. D. SPEVACK, *Assistant Examiner.*